United States Patent

Tsunetomi et al.

[11] Patent Number: 5,539,474
[45] Date of Patent: Jul. 23, 1996

[54] METHOD AND APPARATUS FOR SHIFTING A DISPLAY POSITION OF A SMALL-SIZED PICTURE ON A DISPLAY SCREEN OF A TELEVISION RECEIVER

[75] Inventors: Yoshinobu Tsunetomi, Kanagawa; Toshihide Hayashi, Saitama, both of Japan

[73] Assignee: Sony Corporation, Tokyo, Japan

[21] Appl. No.: 170,796

[22] Filed: Dec. 21, 1993

[30] Foreign Application Priority Data

Jan. 6, 1993 [JP] Japan .................................. 5-000392

[51] Int. Cl.⁶ ........................................... H04N 5/45
[52] U.S. Cl. ........................... 348/556; 348/558; 348/564
[58] Field of Search ....................... 348/556, 445, 348/173, 555, 558, 913, 565, 583, 564, 588, 584; 358/22, 183; H04N 5/45, 5/46

[56] References Cited

U.S. PATENT DOCUMENTS

| | | | |
|---|---|---|---|
| 4,670,784 | 6/1987 | Goldberg | 348/556 |
| 4,984,081 | 1/1991 | Miyoshi et al. | 348/445 |
| 5,130,800 | 7/1992 | Johnson et al. | 358/183 |
| 5,132,793 | 7/1992 | Hirahata et al. | 358/140 |
| 5,170,256 | 12/1992 | Tabata | 348/173 |
| 5,231,491 | 7/1993 | Holoch | 348/445 |
| 5,291,295 | 3/1994 | Srivastava | 348/805 |
| 5,313,303 | 5/1994 | Ersoz et al. | 348/439 |

FOREIGN PATENT DOCUMENTS

| | | | |
|---|---|---|---|
| 0326339 | 1/1989 | European Pat. Off. | H04N 5/44 |
| 0381271A1 | 1/1990 | European Pat. Off. | H04N 5/262 |
| 2217549A | 4/1989 | United Kingdom | H04N 5/45 |
| 2222051A | 6/1989 | United Kingdom | H04N 5/265 |

*Primary Examiner*—Safet Metjahic
*Assistant Examiner*—Nina N. West
*Attorney, Agent, or Firm*—Jay H. Maioli

[57] ABSTRACT

In order to reduce nonuniform deterioration of a display screen, such as a fluorescent screen, an image reproducing system such as a television receiver is so arranged that the position of a small picture is shifted automatically. The small picture may be a picture displayed on a larger display screen with blank margins, or a sub-picture displayed in a larger picture, or an image of alphanumeric data items. For example, a 4:3 aspect ratio picture is displayed in a 4:3 center section of a 16:9 wide aspect ratio screen between left and right blank margins. In this case, the system comprises a control section, such as a microcomputer, for determining whether a special display mode to display a small picture is selected or not, each time the power supply is turned on, and for shifting the position of the small picture in the larger screen when the special display mode is selected.

1 Claim, 7 Drawing Sheets

METHOD AND APPARATUS FOR SHIFTING A DISPLAY POSITION OF A SMALL-SIZED PICTURE ON A DISPLAY SCREEN OF A TELEVISION RECEIVER

BACKGROUND OF THE INVENTION

The present invention relates to the image reproducing equipment which can display imagery on a part of a display screen, and more specifically to television receivers which can display pictures of an aspect ratio different from the aspect ratio of the display screen or which can display a small sub picture, or a visual representation of information, in a large master picture.

A high definition television system employs a wide aspect ratio of 16:9, and a high definition television receiver has a wide screen to display 16:9 images, whereas a conventional NTSC or PAL television receiver has a 4:3 screen. To attain mutual compatibility, adjustment to a different aspect ratio is required. A compatible television receiver is designed to use only a center section of the screen, to display pictures of a different aspect ratio.

As shown in FIG. 7, a display screen 20 of the 4:3 aspect ratio, for instance, is divided into a center section L1 and upper and lower marginal sections L2. Valid picture signals of the 16:9 aspect ratio are displayed in the center section L1, and added invalid blank picture-signals are displayed in the upper and lower marginal sections L2.

In the case of a wide screen 20 of the 16:9 aspect ratio, as shown in FIG. 8, valid picture signals of the 4:3 aspect ratio are displayed only in a center section L1 between left and right blank marginal sections L2.

In any case, the invalid picture signal is a signal of a fixed luminance (or brightness) at the black or white level or some other level. Therefore, there is formed a sharp difference in brightness between the center section L1 and each blank marginal section L2.

In these conventional compatible television receivers, however, the division into the center section L1 and the marginal sections L2 is fixed, and pictures are always reproduced in the same center section fixed in the screen. As a result, the screen such as the fluorescent screen of a CRT deteriorates nonuniformly, rapidly in the center section, that is, and degrades the quality of picture.

The same problem arises in the case of a television receiver capable of displaying a sub picture as shown in the left lower corner of a screen 20 in FIG. 9 or visual indication of data as shown in the right upper corner of the screen 20 of FIG. 9.

SUMMARY OF THE INVENTION

It is therefore an object of the present invention to provide a television receiver or a monitor which can minimize the nonuniform deterioration of the display screen.

According to the present invention, a television receiver comprising:

a display device comprising a display screen;

a detecting means which, each time said television receiver is turned on, determines whether an input picture signal contains a small-sized picture signal which is smaller in number of pixels than said display screen; and a controlling means for shifting a position of presentation of said small-sized picture signal on said display screen, by a predetermined amount from a previous position of presentation when said small-sized picture signal is detected.

Therefore, the position of the small-sized picture produced by the small-sized picture signal is not fixed, but shifted on the display screen.

DETAILED DESCRIPTION OF THE INVENTION

Figure 1:
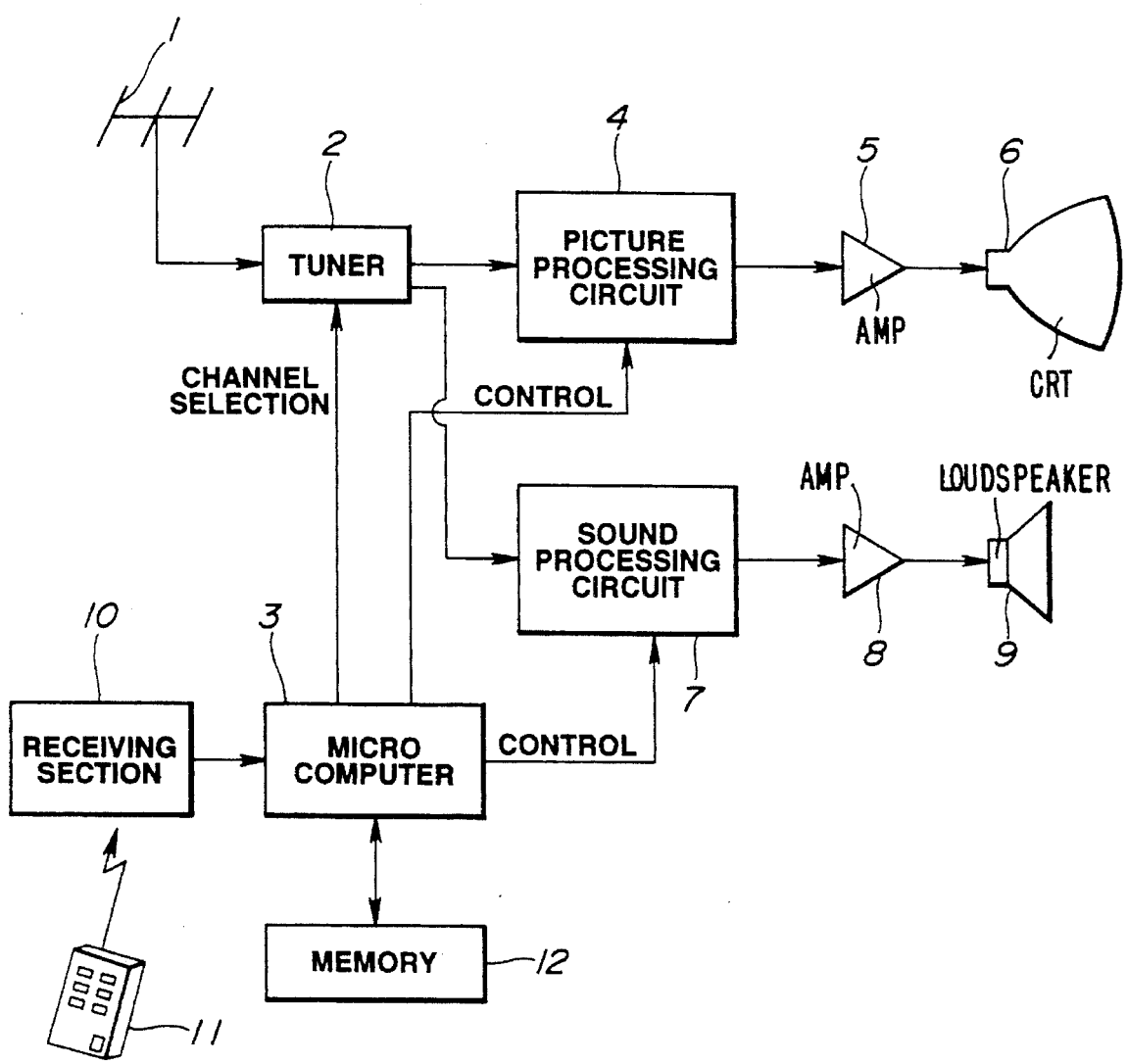
FIG. 1 is a block diagram showing a television receiver of a first practical example according to the present invention.
Figure 2:
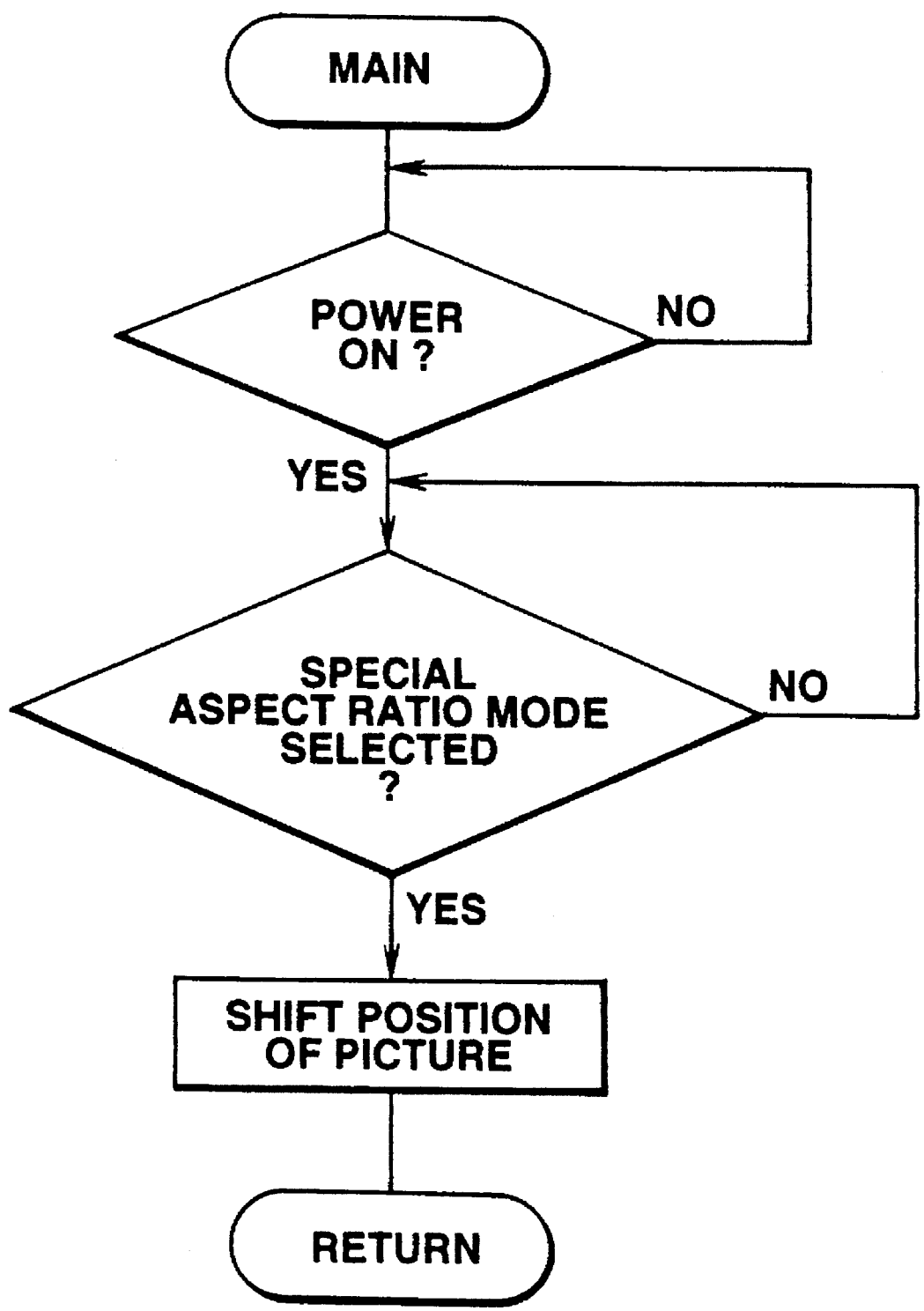
FIG. 2 is a flowchart showing a control procedure in the first practical example.

FIGS. 1 and 2 show a first practical example according to the present invention.

As shown in FIG. 1, a television receiver of this example includes a CRT having a wide screen of a 16:9 aspect ratio. A transmitted television signal is received by an antenna 1, and delivered to a tuner 2. The tuner 2 selects a desired channel in accordance with a channel selection signal supplied from a microcomputer 3, and takes out picture signal and sound signal of the desired channel in the form of first intermediate frequency signals. Then, the tuner 2 returns the intermediate picture and sound signals to the baseband, and outputs these signals.

A picture (video) processing circuit 4 receives the picture signal from the television tuner 2, and processes the input picture signal in response to a control signal of the microcomputer 3. The processed picture signal is supplied through an amplifier 5 to the picture tube 6. On the other hand, a sound (audio) processing circuit 7 receives the sound signal, and processes the sound signal in response to a control signal of the microcomputer 3. The processed sound signal is supplied through an amplifier 8 to a loudspeaker (or loudspeaker system) 9.

A memory 12 stores channel selection data, user control data, picture size data, and other pieces of information. The microcomputer 3 is connected with the memory 12, and arranged to read out data from the memory 12. A receiving section 10 receives a user's command signal transmitted from a remote control transmitter (or remote commander) 11, and delivers the received command signal to the microcomputer 3. In accordance with the command signal, the microcomputer 3 controls the tuner 2, the picture and sound processing circuits 4 and 7 and other parts of the receiver, and executes a program shown in a flowchart of FIG. 2 each time the power source is turned on.

The picture processing circuit 4 includes an adjusting means (or aspect ratio converting means) for adjusting an input picture signal 1 of a different aspect ratio so that it can be displayed on the 16:9 screen of the picture tube 6. In the case of a picture signal of the conventional 4:3 aspect ratio, the adjusting means performs data compression to ¾ in time in the horizontal line direction, and other operations to display the input picture signal in a picture section (aspect ratio 4:3) of the display screen, and to display inserted blank signals in marginal sections of the display screen. The inserted blank signal of this example is a fixed luminance picture signal fixed at the black level. The microcomputer 3 is arranged to select one of a normal aspect ratio mode and a special aspect ratio mode in accordance with a picture size command signal transmitted from the remote controller 11. In the normal mode, the input picture signal is displayed without the adjustment of the adjusting means. In the special mode, the input picture signal is displayed after undergoing the adjustment of the adjusting means. This receiver is arranged to change the position of the picture section (the position of presentation or the picture position) in which the input picture signal is displayed in the special mode, in response to the control signal of the microcomputer 3. Therefore, the position of the picture is shifted in the display screen of the CRT under the control of the microcomputer 3.

Figure 8:
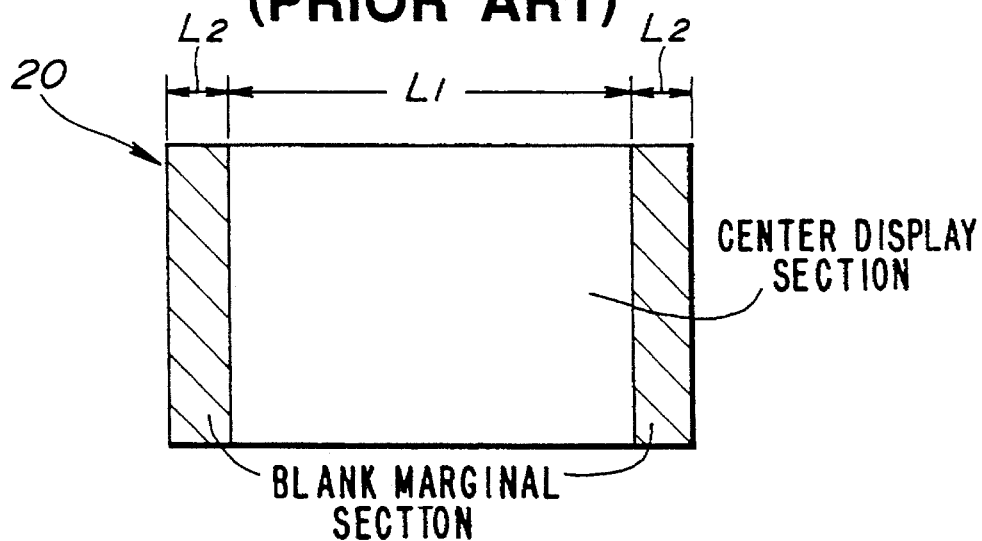
FIG. 8 is a schematic view showing a 4:3 picture displayed on a 16:9 screen in a conventional example.
Figure 9:
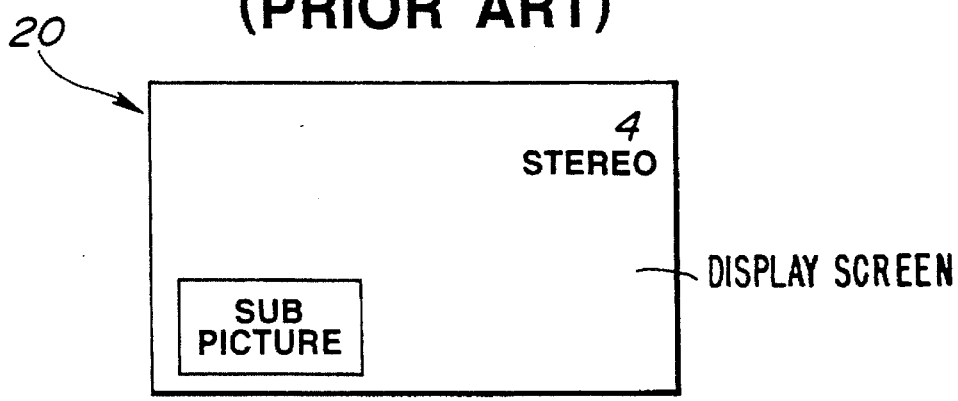
FIG. 9 is a schematic view showing a sub-picture and a visual indication in a master picture in a conventional television receiver.

The microcomputer 3 controls the position of the picture by performing the procedure shown in FIG. 2. When the power supply of the television receiver is turned on, the picture signal of the wide aspect ratio of 16:9 is inputted, and the normal aspect ratio display mode is selected, then a 16:9 meaningful picture is displayed on the entire area of the 16:9 display screen with no margins. When the 4:3 picture signal is inputted and the special aspect ratio display mode is selected, the 4:3 input picture is displayed in the 4:3 picture section in the 16:9 wide screen (in the same manner as shown in FIG. 8) which is shifted from the previous position of the picture section. Therefore, each time the power supply of the receiver is turned on, this receiver changes the position of the picture section, and the positions of the boundaries between the picture section and the marginal sections, in the screen. By so doing, this receiver can make the deterioration uniform on the CRT fluorescent screen. In order to reduce the nonuniform deterioration of the screen, it is desirable to shift the picture position to many different positions. The receiver may be arrange to select the special display mode in response to a human operation or automatically.

Figure 3:
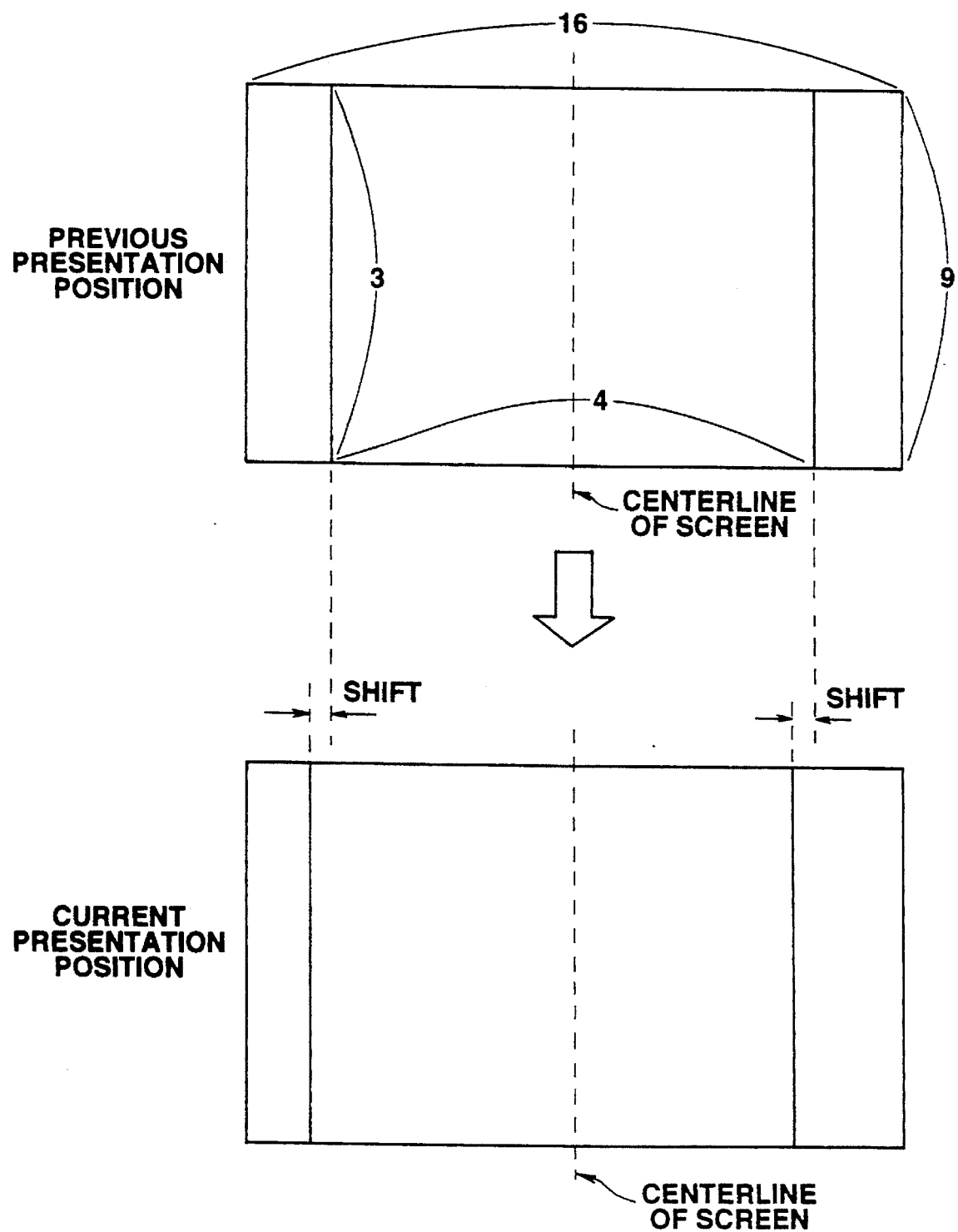
FIG. 3 is a view for illustrating how the television receiver of the first practical example change the picture position on the screen.

As shown in FIG. 3 by way of example, the 4:3 picture section was positioned at the middle of the 16:9 wide screen the last time, and the 4:3 picture section is slightly shifted to the left this time. The amount of shift (or displacement) is so small that the shifting is not readily noticeable to viewers. The picture section is shifted by ±1 cm with respect to the centerline of the screen, for instance.

The present invention is applicable, in the same manner as in this example, to a television receiver having a 4:3 display screen.

Figure 4:
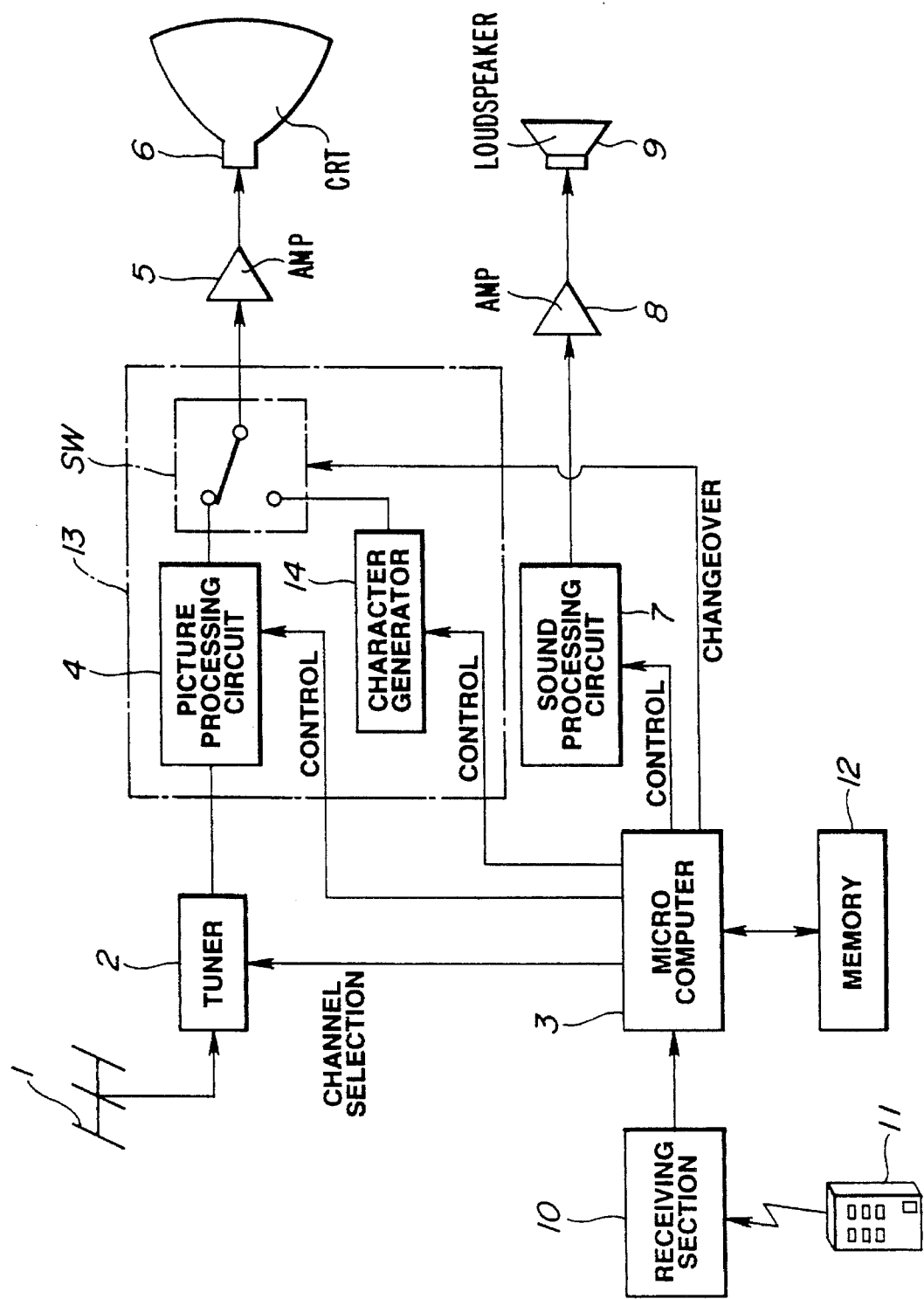
FIG. 4 is a block diagram showing a television receiver of a second practical example according to the present invention.
Figure 5:
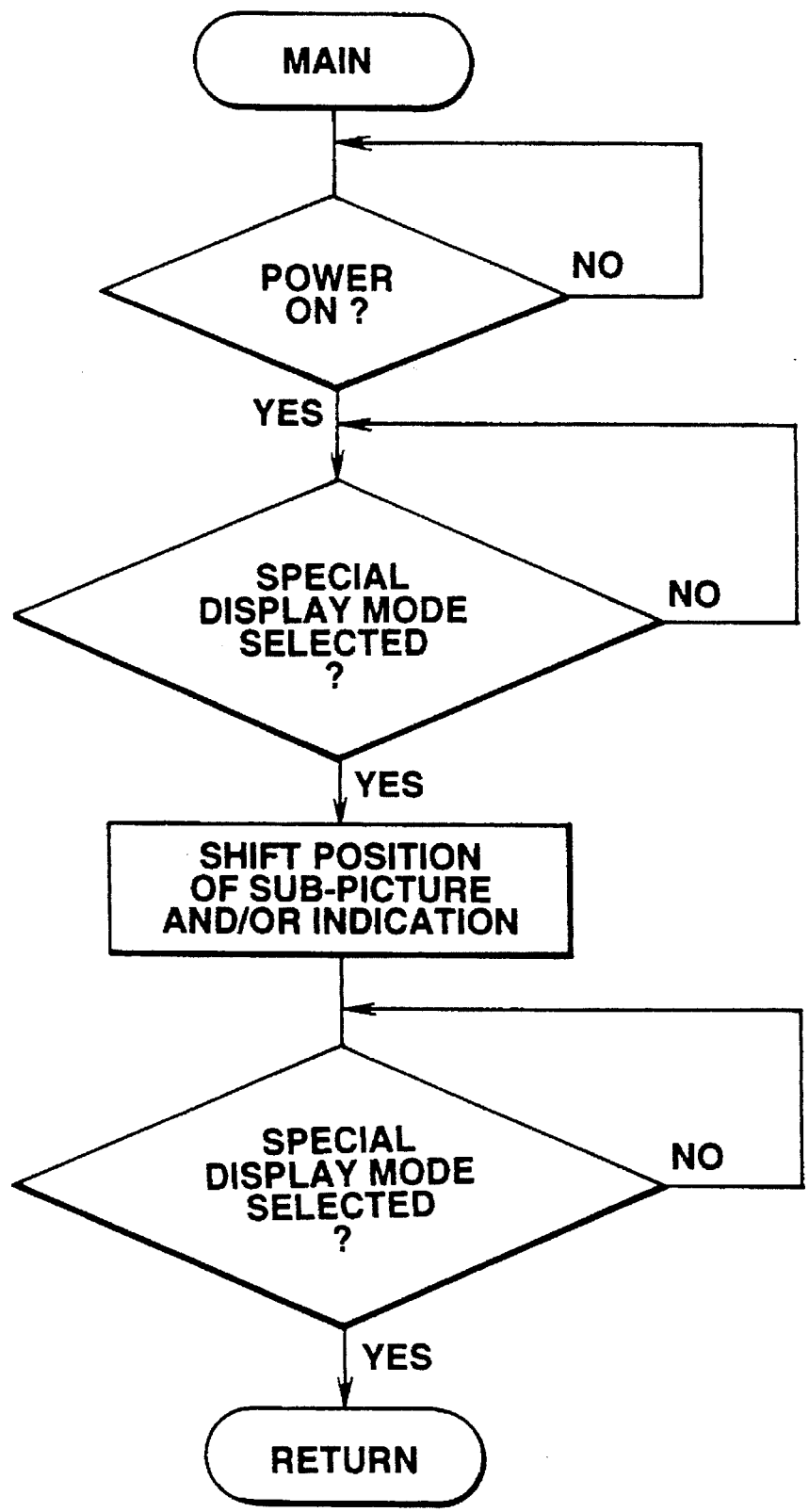
FIG. 5 is a flowchart showing a control procedure of the second practical example.

FIGS. 4 and 5 show a second embodiment according to the present invention. A television receiver of this example is arranged to present a visual representation in a portion of the screen.

As shown in FIG. 4, the television receiver includes an antenna 1, a tuner 2, a microcomputer 3, a video amplifier 5, a CRT 6, a sound processing circuit 7, an audio amplifier 8, a loud speaker or speakers 9, a receiving section 10, a small portable remote control device 11, and a memory 12 as in the first embodiment shown in FIG. 1.

The television receiver shown in FIG. 4 further includes a picture processing section (or picture processing means) 13 which, in this example, includes a picture processing circuit 4, a character generator 14 and a changeover switch SW. The changeover switch SW selects one of a main picture signal outputted from the picture processing circuit 4 and a subordinate picture signal outputted from the character generator 14, and delivers the selected picture signal to the picture tube 6 through the video amplifier 5. The subordinate picture signal of the character generator 14 is a picture signal for indicating useful information on the display screen. For example, the subordinate signal produces images of alphanumeric characters to inform the viewer of the currently selected channel ("4") and the currently selected mode of sound reproduction ("STEREO").

Each of the character generator 14 and the changeover switch SW is connected with the microcomputer 3. The microcomputer controls the changeover timing of the switch SW. The microcomputer 3 further controls the character generator 14, and determines the message to be presented on the screen by the subordinate picture signal. The microcomputer 3 can further control the position of indication of the subordinate picture signal in the area of the display screen.

The microcomputer 3 receives an indication/cancellation command signal through the receiving section from the remote control device 11 operated by the user. In response to this command signal, the microcomputer 3 selects one of a normal display mode and a special display mode. In the normal display mode, the picture tube 6 displays only the main picture signal from the tuner 2. In the special display mode, the main picture signal of the tuner 2 and the subordinate picture signal of the character generator 14 are both displayed on the screen.

The microcomputer 3 executes the control program shown in FIG. 5 when the television receiver is turned on.

Figure 6:
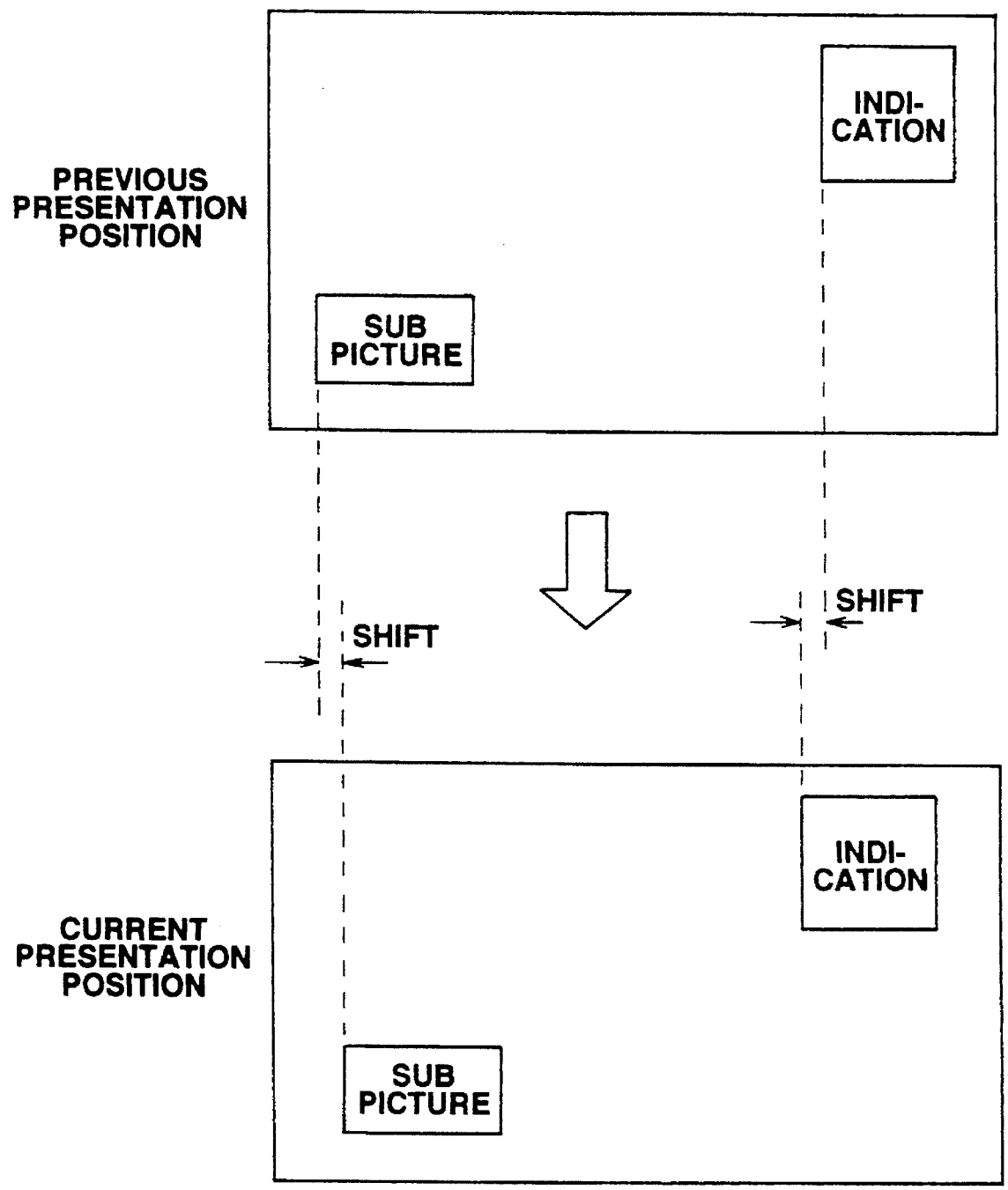
FIG. 6 is a view for illustrating how the television receiver of the second embodiment of the present invention changes the picture position on the screen.
Figure 7:
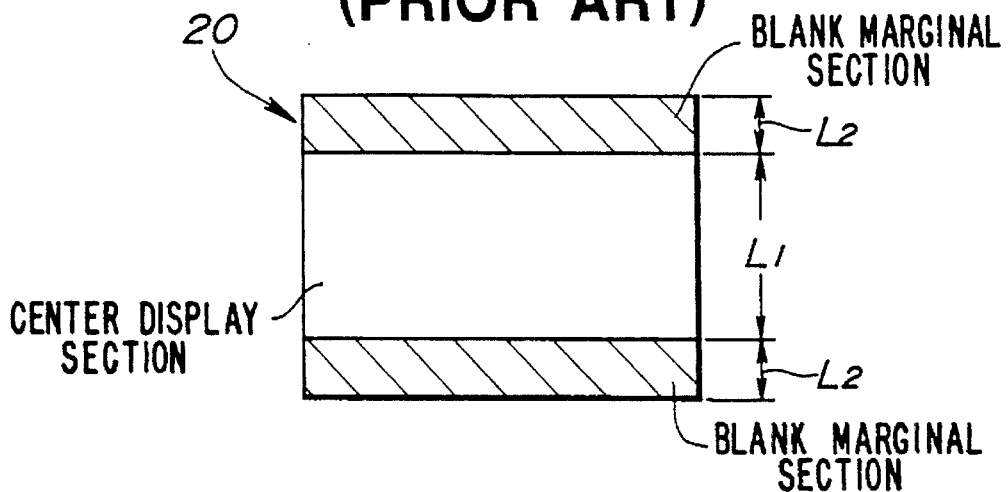
FIG. 7 is a schematic view showing a 16:9 picture displayed on a 4:3 screen of a conventional receiver.

If the special display mode is selected at the command from the remote control device 11, then the microcomputer controls the character generator 14 and the changeover switch SW so that the subordinate picture signal is indicated at a current position of indication which is shifted from a previous position of indication on the screen, as shown in FIG. 6. As a result, the position of indication is shifted each time the power supply of the television receiver is turned on. This shifting reduces the nonuniform deterioration of the screen. To attain this objective, it is desirable to shift the indication to as many different positions as possible. The amount of shift can be determined in the same manner as in the first embodiment shown in FIGS. 1–3.

In the same manner as the shifting of the position of indication, it is possible to shift the position of a sub-picture in a main (or master) picture each time the power supply is turned on.

As explained above, an image reproducing system, such as a television receiver, according to the present invention, comprises:

a picture processing section which produces a normal output picture signal in accordance with an input picture signal when a normal display mode is selected, and which produces a special output picture signal in accordance with said input picture signal, and causes said display unit to display a small picture on said display screen when a special display mode is selected;

a display device which comprises a display screen, which receives said normal output picture signal and produces a large visual picture substantially in an entire surface of said display screen in response to said normal output picture signal when said normal display mode is selected, and which receives said special output picture signal and produces a small visual picture having a picture size smaller than a screen size of said display screen in response to said special output picture signal when said special display mode is selected; and a control section which determines whether said special display mode is selected, and shifts the position of said small picture in said display screen each time said system is turned on. The reproducing system may further comprise a television tuner for supplying said input picture signal to said picture processing section, and a selecting means for selecting one of said normal display mode and said special display mode and producing a selection signal which is in a first signal state when said normal display mode is selected, and in a second signal state when said special display mode is selected.

Therefore, the position of the small picture is shifted on the display screen so that the nonuniform deterioration of the display screen is minimized.

What is claimed is:

1. A method for displaying an input picture signal of a 4:3 aspect ratio on a television receiver having a display screen of a 16:9 aspect ratio, comprising the steps of:

selecting a special aspect ratio display mode whereby the input picture signal is displayed at a first position on said display screen and an inserted signal of fixed brightness is displayed in a blank section of said display screen;

detecting each time the television receiver is turned on;

detecting each time the special aspect ratio display mode is selected upon detecting that the television receiver was turned on; and shifting a position at which the input picture signal is displayed to a second position that differs from said first position by a predetermined amount upon detecting that the special aspect ratio mode was selected.

\* \* \* \* \*